H. F. PATTON.
DEVICE FOR UNPACKING AND SEPARATING DRIED FRUITS.
No. 172,278. Patented Jan. 18, 1876.
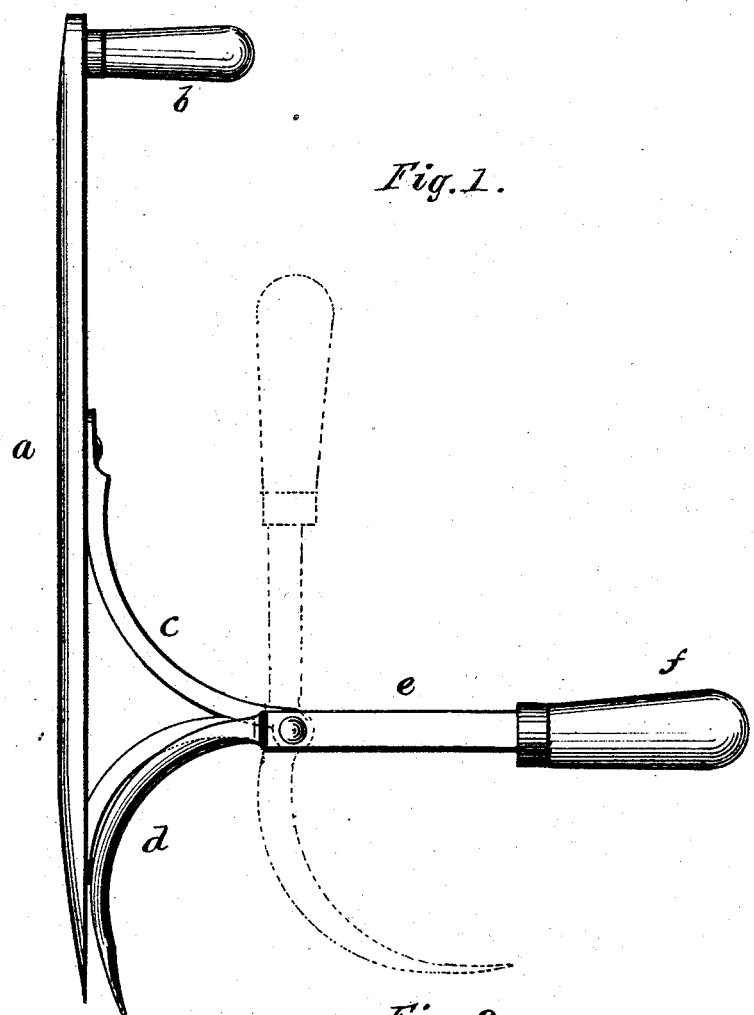
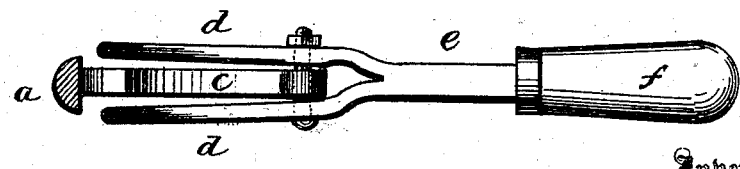

UNITED STATES PATENT OFFICE.

HENRY F. PATTON, OF APPLETON, ASSIGNOR OF ONE-HALF HIS RIGHT TO ALBERT S. DEAN, OF EAU CLAIRE, WISCONSIN.

IMPROVEMENT IN DEVICES FOR UNPACKING AND SEPARATING DRIED FRUITS.

Specification forming part of Letters Patent No. 172,278, dated January 18, 1876; application filed December 22, 1875.

*To all whom it may concern:*

Be it known that I, HENRY F. PATTON, of Appleton, Outagamie county, State of Wisconsin, have invented a new and useful Improvement in Devices for Removing Dried Fruit from Barrels, &c., of which the following is a full description, reference being had to the accompanying drawings, in which—

Figure 1 is a side elevation; Fig. 2, a detail.

It is customary to pack dried apples and other fruits in barrels and other packages under pressure, and it is difficult to remove the fruit in small quantities, as it is necessary for the retailer to do.

The object of this invention is to make a device by the use of which to facilitate the removal of such fruits and other similar articles, which I accomplish by providing a bar or rod with a bracket, to which is pivoted a claw having a handle, by means of which to operate such claw, as more fully hereinafter described.

In the drawings, $a$ represents a bar or rod, pointed at its lower end, and provided with any suitable handle, $b$, at its upper end. $c$ is a bracket, permanently secured to $a$ near its lower end. $d$ is a claw having two prongs, as shown, pivoted to the bracket $c$ at $e$. $f$ is a handle attached to the claw $d$. The parts are so arranged that they can occupy the position shown in Fig. 1, the points of the claw being a little above the point of the bar or rod $a$.

In use the parts are to be placed in the position shown in Fig. 1, and the point of $a$ is to be forced down into the fruit—preferably at the side of the package. Then, by lifting up on the handle $f$, the claw will be drawn through the fruit, and brought into the position shown by dotted lines, loosening the fruit in its passage, which operation can be repeated as often as may be necessary.

The bar $a$, the bracket, and claw should be made of metal. The handle $f$ may be either of metal or wood.

For ordinary purposes $a$ may be about two feet long; the bracket about five inches from the bar $a$ at the point $e$, and the claw, with its handle, about eighteen inches long.

What I claim as new, and desire to secure by Letters Patent, is—

The claw $d$, provided with a handle, $f$, in combination with the bar or rod $a$ and bracket $c$, substantially as and for the purposes set forth.

HENRY F. PATTON.

Witnesses:
ALBERT S. DEAN,
J. E. HARRISON.